US012720238B2

(12) United States Patent
Leung

(10) Patent No.: US 12,720,238 B2
(45) Date of Patent: Aug. 25, 2026

(54) SYSTEM AND METHOD FOR ESTABLISHING CALLS

(71) Applicant: TEXTNOW, INC., Waterloo (CA)

(72) Inventor: Kai Yip Leung, Fremont, CA (US)

(73) Assignee: TEXTNOW, INC., Waterloo (CA)

( * ) Notice: Subject to any disclaimer, the term of this patent is extended or adjusted under 35 U.S.C. 154(b) by 220 days.

(21) Appl. No.: 18/592,023

(22) Filed: Feb. 29, 2024

(65) Prior Publication Data

US 2025/0280214 A1 Sep. 4, 2025

(51) Int. Cl.
*H04M 3/00* (2024.01)
*H04Q 3/00* (2006.01)

(52) U.S. Cl.
CPC ................................ *H04Q 3/0016* (2013.01)

(58) Field of Classification Search
CPC .................................................. H04Q 3/0016
USPC ........................................... 379/242, 201.01
See application file for complete search history.

(56) References Cited

U.S. PATENT DOCUMENTS

| | | | | |
|---|---|---|---|---|
| 5,309,505 A * | 5/1994 | Szlam | H04M 3/523 379/162 |
| 5,311,574 A * | 5/1994 | Livanos | H04Q 11/0428 379/266.03 |
| 5,311,583 A * | 5/1994 | Friedes | H04M 3/48 379/207.03 |
| 5,436,967 A * | 7/1995 | Hanson | H04M 3/51 379/266.01 |
| 5,692,033 A * | 11/1997 | Farris | H04M 3/523 379/221.09 |
| 5,784,438 A * | 7/1998 | Martinez | H04Q 3/0016 379/230 |
| 5,946,385 A * | 8/1999 | Sonnenberg | H04M 3/42229 379/221.09 |
| 7,630,486 B2 * | 12/2009 | Lee | H04M 3/48 709/248 |
| 10,009,467 B1 * | 6/2018 | Valiente | H04M 3/493 |
| 10,498,904 B1 * | 12/2019 | Sandler | H04M 3/4936 |
| 2014/0321632 A1 * | 10/2014 | Di Fabbrizio | H04M 3/4286 379/207.04 |

* cited by examiner

*Primary Examiner* — William J Deane, Jr.
(74) *Attorney, Agent, or Firm* — Perry + Currier Inc.

(57) ABSTRACT

An example method includes: receiving, from an initiating device, a call destined for a target account; establishing, at a server, a central call session for the call and connecting the initiating device to the central call session; sending a central call session notification to a target device associated with the target account, the central call session notification to prompt the target device to initiate a request to join the central call session; receiving, from the target device, a response to the central call session notification; and when the response comprises the request to join the central call session, connecting the target device to the central call session to establish the call.

20 Claims, 6 Drawing Sheets

Device 108

Server 104

Network 112

Device 116

405
[INVITE] *call-id:123*

410
Central call session; *ccs-id:456*

Connect

415
CCS not.; *ccs-id:123*

420
Alert

430
[INVITE] *ccs-id:456*

410
Central call session; *ccs-id:456*

Connect

435
Call established via *ccs-id:456*

SYSTEM AND METHOD FOR ESTABLISHING CALLS

FIELD

The specification relates generally to telecommunication services, and more particularly to a system and method for establishing calls.

BACKGROUND

Telecommunications services use an exchange of messages to provision the correct information to establish a communications session. In particular, signaling protocol specifies the registration of devices prior to connecting an incoming call. However, in modern systems, many devices are already registered with their respective servicing servers, resulting in redundant and time-consuming exchanges.

SUMMARY

According to an aspect of the present specification an example method includes: receiving, from an initiating device, a call destined for a target account; establishing, at a server, a central call session for the call and connecting the initiating device to the central call session; sending a central call session notification to a target device associated with the target account, the central call session notification to prompt the target device to initiate a request to join the central call session; receiving, from the target device, a response to the central call session notification; and when the response comprises the request to join the central call session, connecting the target device to the central call session to establish the call.

According to another aspect of the present specification, an example method includes: receiving, at a target device, a central call session notification from a server, the central call session notification indicating a call; signaling the central call session notification to prompt a response to the central call session notification; and when the response comprises an acceptance of the call, sending a request to join the central call session to the server to accept the call.

According to another aspect of the present specification, an example server includes: a memory and a communications interface; a processor interconnected with the memory and the communications interface, the processor configured to: receive, from an initiating device, a call destined for a target account; establish a central call session for the call and connecting the initiating device to the central call session; send a central call session notification to a target device associated with the target account, the central call session notification to prompt the target device to initiate a request to join the central call session; receive, from the target device, a response to the central call session notification; and when the response comprises the request to join the central call session, connect the target device to the central call session to establish the call.

According to another aspect of the present specification, an example computing device comprising: a memory and a communications interface; and a processor interconnected with the memory and the communications interface, the processor configured to: receive, at a target device, a central call session notification from a server, the central call session notification indicating a call; signal the central call session notification to prompt a response to the central call session notification; and when the response comprises an acceptance of the call, send a request to join the central call session to the server to accept the call.

BRIEF DESCRIPTION OF DRAWINGS

Implementations are described with reference to the following figures, in which.

DETAILED DESCRIPTION

Call services may establish calls using a series of industry-standardized communications protocols, such as the session initiation protocol (SIP) to initialize communications sessions between endpoint devices (i.e., a source device from which the communication session is initiated, and a target device for which the communication session is destined).

In particular, as part of the standardized SIP exchange for an incoming call destined for a target device, the target device is configured to register with the servicing server. This registration process requires extra exchanges and hence takes extra time and can cause delays and/or failures in establishing the call.

Accordingly, as described herein, an example system for establishing calls using call sessions is provided. In particular, the system, and more specifically, the call service server, receives an incoming call destined for a target account and, rather than pushing a call notification to the target device, thereby initiating the registration process, the server establishes a call session hosted centrally at the server (i.e., a central call session). The server may then send a central call session notification to the target device to prompt the target device to initiate a request to join the central call session. In particular, the target device may display the central call session notification to an operator or user as an incoming call, and may process the central call session notification by responding with the request to join the central call session or a rejection of the call. Accordingly, from the perspective of the target device, the request to join the central call session may be processed as an outgoing call (i.e., to the central call session), thereby simplifying the signaling process. The server may then process the request to join the central call session by connecting the target device to the central call session, thereby effectively establishing the call between the initiating device and the target device via the central call session.

Figure 1:
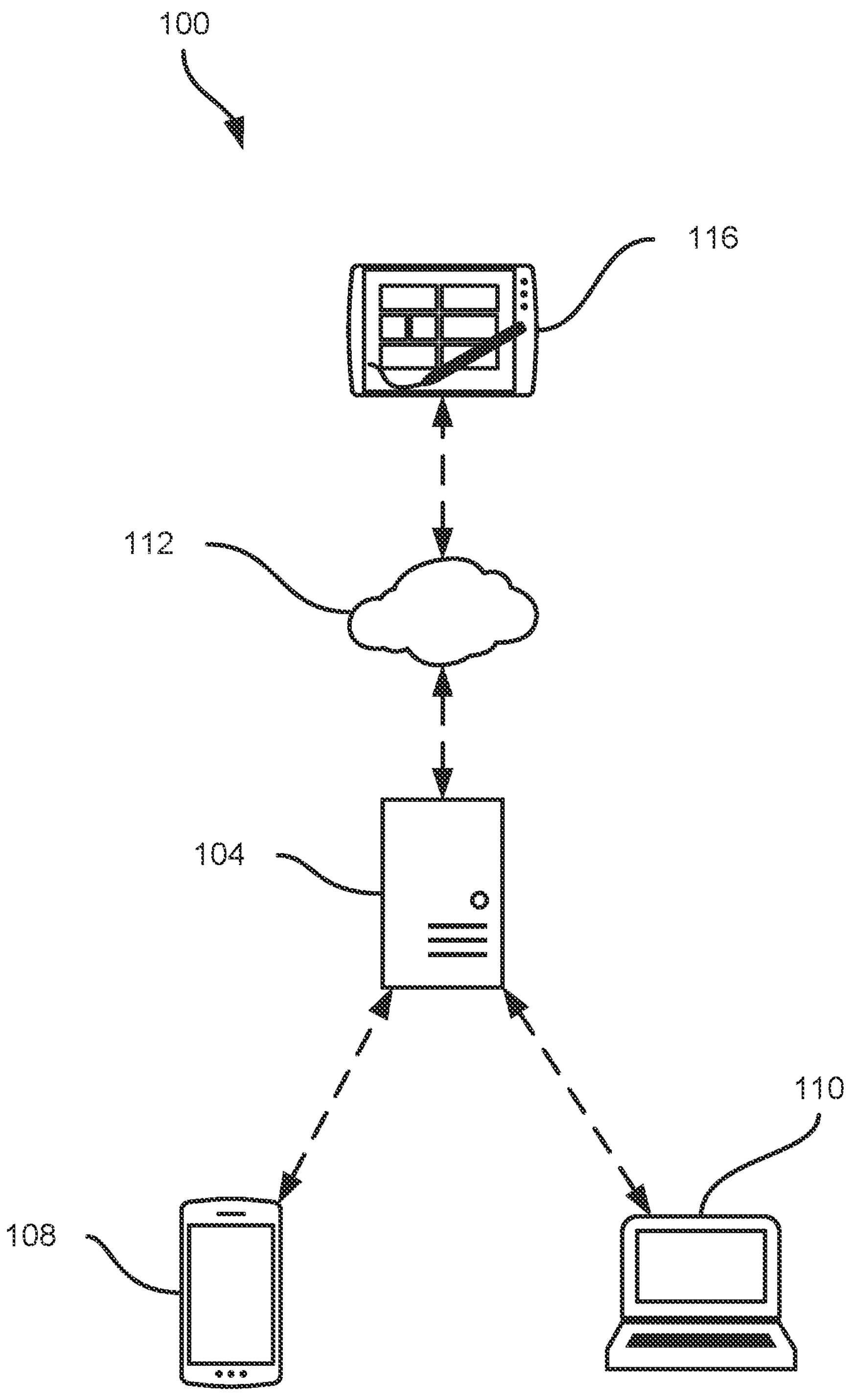
FIG. 1 depicts a schematic diagram of an example system for establishing calls using central call sessions.

FIG. 1 depicts a system 100 for establishing calls using call sessions. The system 100 includes a call service server 104 (also referred to herein as simply the server 104), computing devices 108, 110 interconnected with the server 104, a network 112, and a second computing device 116.

The server 104 is generally configured to provide calling services to support calls between computing devices, such as the computing devices 108, 110 (also referred to herein as simply the device 108 and the device 110) and the second computing device 116. The server 104 may be any suitable server environment, including a series of cooperating servers, one or more cloud-based servers, and the like. The internal components of the server 104 will be described in greater detail below.

The computing devices 108, 110 are generally configured to support calling applications, to allow a user of the computing devices 108, 110 to engage in calls (e.g., voice calls, video calls, or the like) with a user of another computing device, such as the second computing device 116. The computing devices 108, 110 may be computing devices such as mobile phones, tablets, laptop computers, desktop computers, or the like. The internal components of the computing device 108 will be described in greater detail below.

The server 104 is in communication with the computing device 108 via one or more communication links, shown in the present example as being wireless communication links. The communication links may be wired, wireless, a combination thereof, and may traverse one or more networks, including local area networks, wide area networks, the internet, and the like. In particular, in the present example, call services and call handling for the computing devices 108, 110 is provided by the call service server 104. That is, the user of the computing devices 108, 110 may subscribe to the call service provided by the server 104. The server 104 may therefore, for example, provision a user account for the user, a telephone number associated with the user account, and the like.

The server 104 is further in communication with the network 112. The network 112 may include any number of networks, including mobile networks, wide area networks, local area networks, public switched telephone networks (PSTNs), combinations of the above, and the like.

The system 100 further includes the second computing device 116, which may be a mobile phone, a tablet, a laptop computer, a desktop computer, or the like. In the present example, the second computing device 116 may be serviced by a call service provider other than the server 104, and which may communicate with the server 104 via the network 112.

The system 100, and in particular, the server 104 is configured to establish calls using call sessions, or central call sessions, hosted at the server 104. In particular, upon receiving an incoming call from the second computing device 116 (i.e., also referred to herein the initiating device 116), the server 104 establishes a central call session at the server 104 and adds or connects the initiating device 116 to the central call session. The server 104 may then send an invitation to one or both of the target devices 108, 110 (i.e., as being associated with the target account to which the incoming call is directed) to prompt the target device 108, 110 to join the central call session. Thus, at the target device 108, 110, the call may be structured as an outgoing call to the central call session, rather than an incoming call from the initiating device 116. Accordingly, the call may be more robust and protected against lost calls due to network or other connectivity issues, since the outgoing call to the central call session may be re-established by either party.

Figure 2:
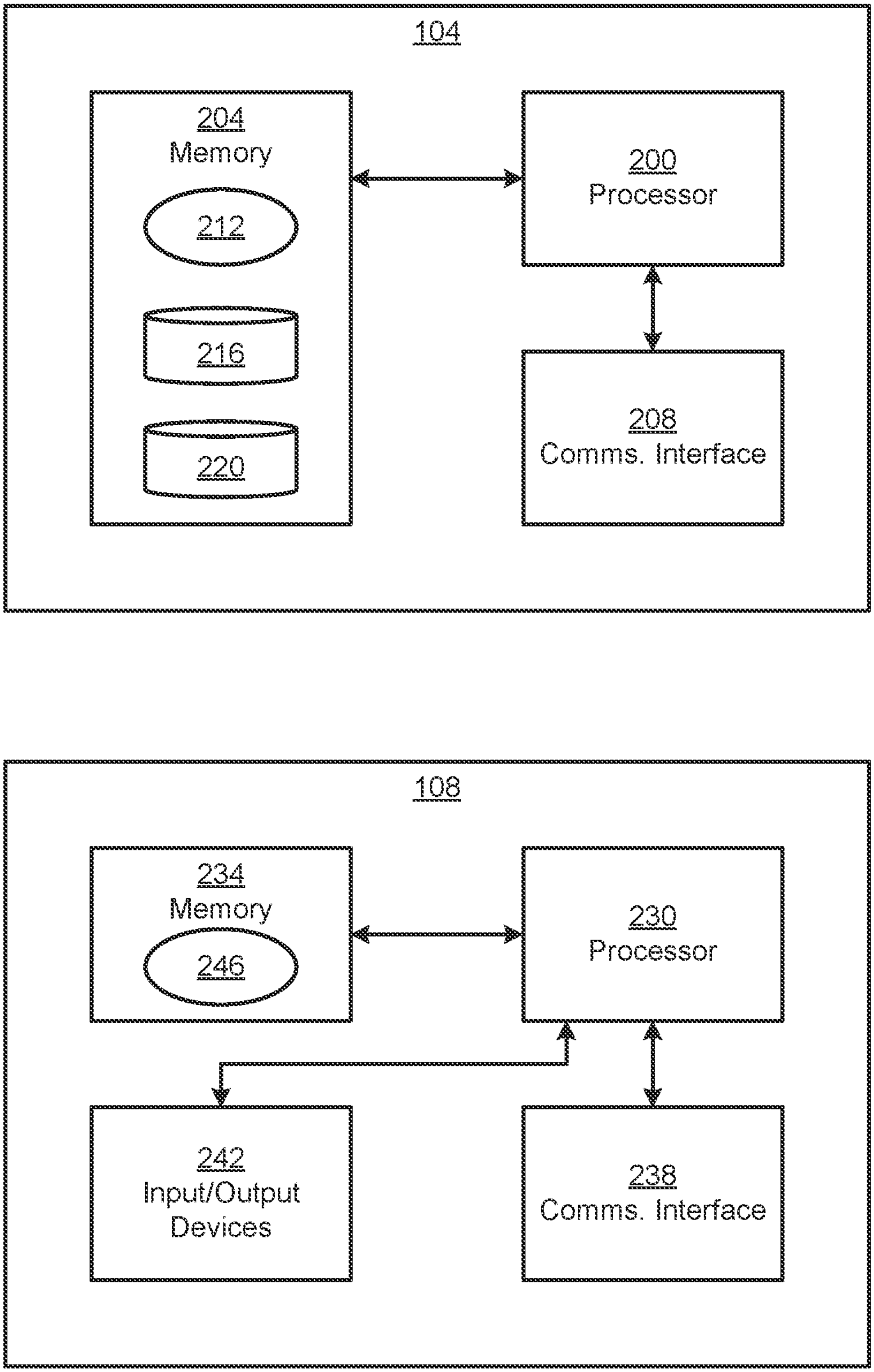
FIG. 2 depicts a block diagram of certain internal components of the server and the device of FIG. 1.

Turning now to FIG. 2, certain internal components of the server 104 and the computing device 108 are depicted in greater detail. The server 104 includes a processor 200, a memory 204 and a communications interface 208.

The processor 200 may include a central processing unit (CPU), a microcontroller, a microprocessor, a processing core, a field-programmable gate array (FPGA), or similar. The processor 200 may include multiple cooperating processors. The processor 200 may cooperate with the memory 204 to realize the functionality described herein.

The memory 204 may include a combination of volatile (e.g., Random Access Memory or RAM) and non-volatile memory (e.g., read-only memory or ROM, Electrically Erasable Programmable Read Only Memory or EEPROM, flash memory). All or some of the memory 204 may be integrated with the processor 200. The memory stores applications, each including a plurality of computer-readable instructions executable by the processor 200. The execution of the instructions by the processor 200 configures the server 104 to perform the actions discussed herein. In particular, the applications stored in the memory 204 include a server-side call handling application 212. When executed by the processor 200, the application 212 configures the processor 200 to perform various functions discussed below in greater detail and related to the call handling operation of the server 104. The application 212 may also be implemented as a suite of distinct applications. Further, Some or all of the functionality of the application 212 may be implemented as dedicated hardware components, such as one or more FPGAs or application-specific integrated circuits (ASICs).

The memory 204 also stores rules and data for the call handling operation. For example, the memory 204 may include a user account repository 216 storing user account information such as user and/or account identifiers, telephone numbers, mobile directory numbers, or the like associated with the user account, contact and billing information for the user account, computing devices associated with the user account, and the like. For example, in some examples, the devices 108, 110 may be separate computing devices associated with the same user account, while in other examples, each of the devices 108, 110 may be associated with different user accounts.

The memory 204 may further include a call session tracking repository 220 storing call session data, including call session identifiers for ongoing call sessions managed by the server 104, optionally, status identifiers for each of the call identifiers, and the like. For example, some status identifiers may include 'pending' to indicate that the corresponding call has not yet been answered by the target account, 'cancelled' to indicate that the corresponding call was cancelled (e.g., by the source device), 'rejected' to indicate that the target account has rejected the call, and the like. In some examples, further device and/or account information may also be tracked in the call session tracking repository 220. For example, the call session tracking repository 220 may include identifiers (e.g., account identifiers, Internet Protocol (IP) addresses, telephone numbers, etc.) for the participants of each call session, as well as a connectivity status for each participant.

The server 104 further includes the communications interface 208 interconnected with the processor 200. The communications interface 208 may be configured for wireless (e.g., satellite, radio frequency, Bluetooth, Wi-Fi, or other suitable communications protocols) or wired communications and may include suitable hardware (e.g., transmitters, receivers, network interface controllers, and the like) to allow the server 104 to communicate with other computing devices. The specific components of the communications interface 208 are selected based on the types of communication links that the server 104 communicates over.

In some examples, the server 104 may further include one or more input and/or output devices (not shown). The input devices may include one or more buttons, keypads, touch-sensitive display screen, mice, or the like for receiving input from an operator. The output devices may include one or more display screens, monitors, speakers, sound generators, vibrators, or the like for providing output or feedback to an operator.

The device 108 includes a processor 230, a memory 234, a communications interface 238, and one or more input and/or output devices 242.

The processor 230 is similar to the processor 200 and may include a CPU, a microcontroller, a microprocessor, a processing core, an FPGA, or similar. The processor 230 may include multiple cooperating processors. The processor 230 may cooperate with the memory 234 to realize the functionality described herein.

The memory 234 is similar to the memory 204 and may include a combination of volatile and non-volatile memory, and all or some of the memory 234 may be integrated with the processor 230. The memory 234 stores applications, including a device-side call handling application 246. The application 246 includes a plurality of computer-readable instructions executable by the processor 230. The execution of the instructions by the processor 230 configures the device 108 to perform the actions discussed herein. The application 246 may be implemented as a suite of distinct applications. Further, some or all of the functionality of the application 246 may be implemented as dedicated hardware components.

The memory 234 also stores rules and data for the call handling operation. For example, the memory 234 may include one or more repositories, to track call logs, call session identifiers, and the like.

The device 108 further includes the communications interface 238 interconnected with the processor 230. The communications interface 238 may be configured for wireless or wired communications and may include suitable hardware to allow the device 108 to communicate with other computing devices, such as the server 104. The specific components of the communications interface 238 are selected based on the types of communication links that the device 108 communicates over.

The device 108 further includes the one or more input and/or output devices 242. The input devices may include one or more buttons, keypads, touch-sensitive display screen, mice, or the like for receiving input from an operator. The output devices may include one or more display screens, monitors, speakers, ringers, sound generators, vibrators, or the like for providing output or feedback to an operator.

Figure 3:
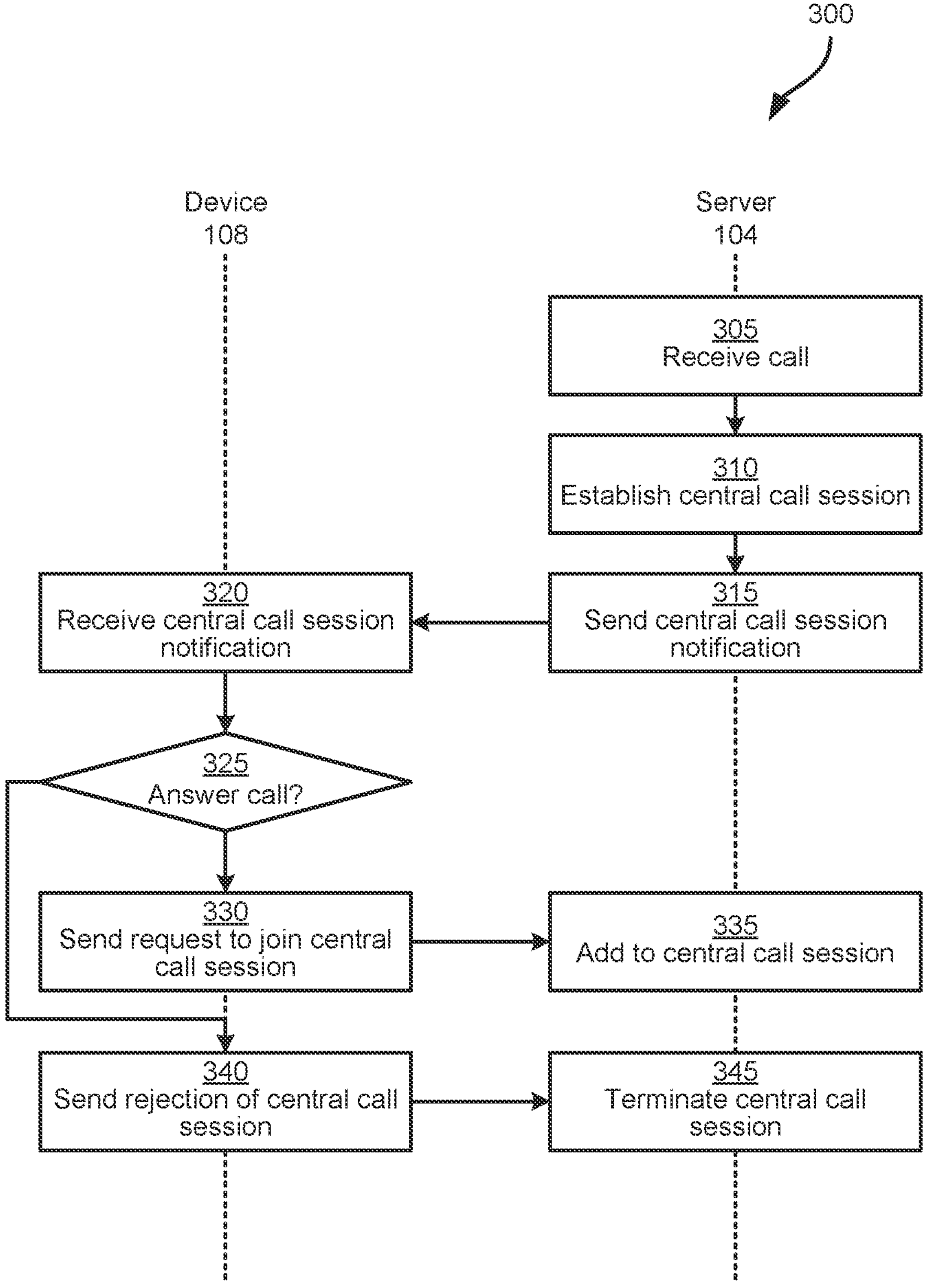
FIG. 3 depicts a flowchart of an example method for establishing calls using central call sessions.

FIG. 3 illustrates a method 300 of handling calls using central call sessions. The method 300 will be discussed in conjunction with its performance in the system 100, and particularly by the server 104, via execution of the application 212, and the device 108, via execution of the application 246. In particular, the method 300 will be described with reference to the components of FIGS. 1 and 2. In other examples, the method 300 may be performed by other suitable devices or systems.

At block 305, the server 104 receives an incoming call destined for a target account. For example, the target of an incoming call may be specified by a target telephone number. In particular, the incoming call may be received, in the present example, from the second computing device 116 via the network 112. That is, the second computing device 116 may act as an initiating device from which the incoming call originates. More particularly, the server 104 may receive the incoming call from a PSTN, another server implementing a call service for the initiating device 116, combinations of the above, or the like.

In some examples, the server 104 may receive the incoming call as a session initiation protocol (SIP) message, and more particularly, an [INVITE] message. In other examples, other suitable signaling protocols may be employed. The incoming call may have a call identifier associated with it, for example embedded in the SIP [INVITE] message or other signaling protocol message.

At block 310, in response to receiving the incoming call, the server 104 processes the incoming call. In particular, the server 104 establishes a central call session hosted at the server 104 for the incoming call. The central call session may be a communications session accessible by multiple parties and/or devices, similar to a conferencing session. In contrast to conferencing sessions, the central call session may be a temporary session hosted and owned by the server 104 and dissociated from the target account to which the incoming call is targeted. That is, a conferencing session may be owned by a specific target account which is targeted by an incoming call to join the conferencing session, and accordingly is persistent in existence and in accessibility by targeting the target account. The central call session is established in response to an incoming call for a target account, but is not owned by the target account, and hence is transient and may not be accessible at the termination of the central call session.

The central call session may be identified by a central call session identifier and recorded in the call session tracking repository 220. That is, the server 104 may be configured to create an entry in the call tracking repository 220 including the call session identifier for the central call session established for the incoming call. For example, the call session identifier may be stored in association with the call identifier for the incoming call and an identifier of the initiating device 116. The server 104 may then add or connect the initiating device 116 to the central call session. In some examples, the server 104 may additionally provide a pending indication at the central call session that the call received from the initiating device 116 is pending, for example by providing an auditory ringing tone or indication at the central call session.

Additionally, at block 310, the server 104 is configured to extract the target account and identify one or more devices associated with the target account. For example, the server 104 may retrieve, from the account repository 216, a set of devices (e.g., by IP address or similar) associated with the target account and/or the target telephone number. For example, the server 104 may identify the device 108 as a target device, in the case that the devices 108, 110 are associated with separate accounts. In other examples, if both the devices 108, 110 are associated with the same target user account, then both of the devices 108, 110 may be identified in the set of target devices. Thus, for example, if a user has a cell phone, a desktop computer, and a tablet, each of which is logged in with the same user account, then each of the devices may be identified as a target device in the set.

At block 315, the server 104 sends a central call session notification to the target device identified at block 310. In examples where a set of multiple target devices is identified at block 310 as being associated with the target account, the server 104 may send a central call session notification to each target device in the set, or a default target device selected from the set. In the present example, the central call session notification is sent from the server 104 to the device 108.

In contrast to conventional call establishment flows, the central call session notification sent at block 315 may be distinct and unrelated to a conventional call notification which signals an incoming call to the target device 108 to prompt the target device 108 to register with the server 104

(e.g., via a SIP [REGISTER] action), thereby allowing the server 104 to forward the SIP [INVITE] message to the target device 108.

Rather, the central call session notification may signal the central call session and the initiating device 116 to the target device 108 to prompt the target device 108 to either reject or join the central call session, as will be further described herein. Notably, the central call session notification does not prompt the target device 108 to register with the server 104.

The central call session notification may be sent, for example using Firebase Cloud Messaging (FCM), Apple Push Notification service (APNs), or other suitable notification services which allow notifications to be sent to the target device. In particular, the central call session notification may include an indication of the call session, the call session identifier, and an indicator of the initiating device 116 (e.g., a telephone number).

At block 320, the device 108 receives the central call session notification from the server 104. In particular, the central call session notification includes the indication of the call session, the call session identifier, and the indicator of the initiating device 116 (e.g., a telephone number). The device 108 may store the extracted data, and in particular, the central call session identifier, for example in the memory 234, such as in an application cache or the like, as a pending call.

In response to receiving the central call session notification, the device 108 may signal the central call session to the user. For example, the device 108 may generate an alert, such as an auditory or mechanical (e.g., vibrational) ring for example based on volume settings at the device 108, a visual notification (e.g., a pop-up), or the like. More particularly, the alert may be provided using one or more of the output devices of the device 108. In particular, the alert may be presented to the user similarly to a call alert signaling an incoming call from the initiating device 116, for example by identifying the initiating device by telephone number, or other indicator, such as a contact name stored at the device 108 or in association with the user account at the server 104. Accordingly, the alert may similarly provide options for accepting or rejecting the call from the initiating device 116.

In some examples, in response to receiving the central call session notification, prior to signaling the central call session to the user, the device 108 may initialize a connection with the server 104 in preparation for later signaling (e.g., to signal the acceptance or rejection of the call). For example, the device 108 may send an initial SIP [INVITE] message to initialize the connection. In some examples, signaling the central call session to the user and initializing the connection may occur substantially simultaneously.

At block 325, the device 108 determines whether the call from the initiating device 116 is accepted (answered) or rejected (not answered). For example, the device 108 may make the determination based on user input to the alert or expiry of a timeout of the alert. For example, if the user indicates acceptance of the call, the device 108 may make an affirmative determination at block 325 to respond affirmatively to the central call session notification. If the user indicates rejection of the call, the device 108 may make a negative determination at block 325 to respond negatively to the central call session notification. If the alert times out (e.g., a predefined amount of time period expires), then the invitation may timeout and the device 108 may similarly make a negative determination at block 325 to respond negatively to the central call session notification.

If, at block 325, the determination is affirmative, then the device 108 proceeds to block 330. At block 330, the device 108 sends a response to the central call session notification to the server 104. In particular, the response may include a request to join the central call session. For example, the request may be a SIP [INVITE] message, or other standard invitation or call initiation according to other signal protocols. Further, the device 108 may include the call session identifier in the SIP [INVITE] message to indicate the central call session which the device 108 is requesting to join. In particular, the SIP [INVITE] message may be a secondary or subsequent SIP [INVITE] message sent via the initially established connection between the device 108 and the server 104.

At block 335, the server 104 receives the request to join the central call session from the device 108 and in response, adds or connects the device 108 to the central call session identified in the request. In particular, having connected both the initiating device 116 and the target device 108 to the central call session, the initiating device 116 and the target device 108 may exchange media and communications, thereby effectively establishing the incoming call from the initiating device 116. Accordingly, the server 104 may additionally terminate a ringing indication at the central call session.

If, at block 325, the determination is negative, then the device 108 proceeds to block 340. At block 340, the device 108 sends a response to the call session notification to the server 104. In particular, the response may include a rejection of the central call session. The rejection may be sent via the initially established connection. For example, the rejection may be a different type of SIP request, such as a [CANCEL] action (e.g., in the case that a SIP [200OK] message is not received in response to the initial SIP [INVITE]), a [BYE] action, or similar, to indicate to the server 104 that the device 108 is rejecting the incoming call from the initiating device 116. The device 108 may therefore include the call session identifier to indicate the central call session which the device 108 is rejecting. The device 108 may further include a custom header in a SIP [BYE] message, for example to indicate whether the rejection is caused by a timeout or an active rejection by a user.

At block 345, the server 104 receives the rejection of the central call session from the device 108 and in response, terminates the central call session identified in the rejection. In such examples, the server 104 may provide an indication of the rejection at the central call session to indicate to the initiating device 116 that the call was rejected. In some examples, when the rejection is caused by a timeout, the server 104 may redirect the initiating device 116 to a voicemail for the device 108.

Figure 4:
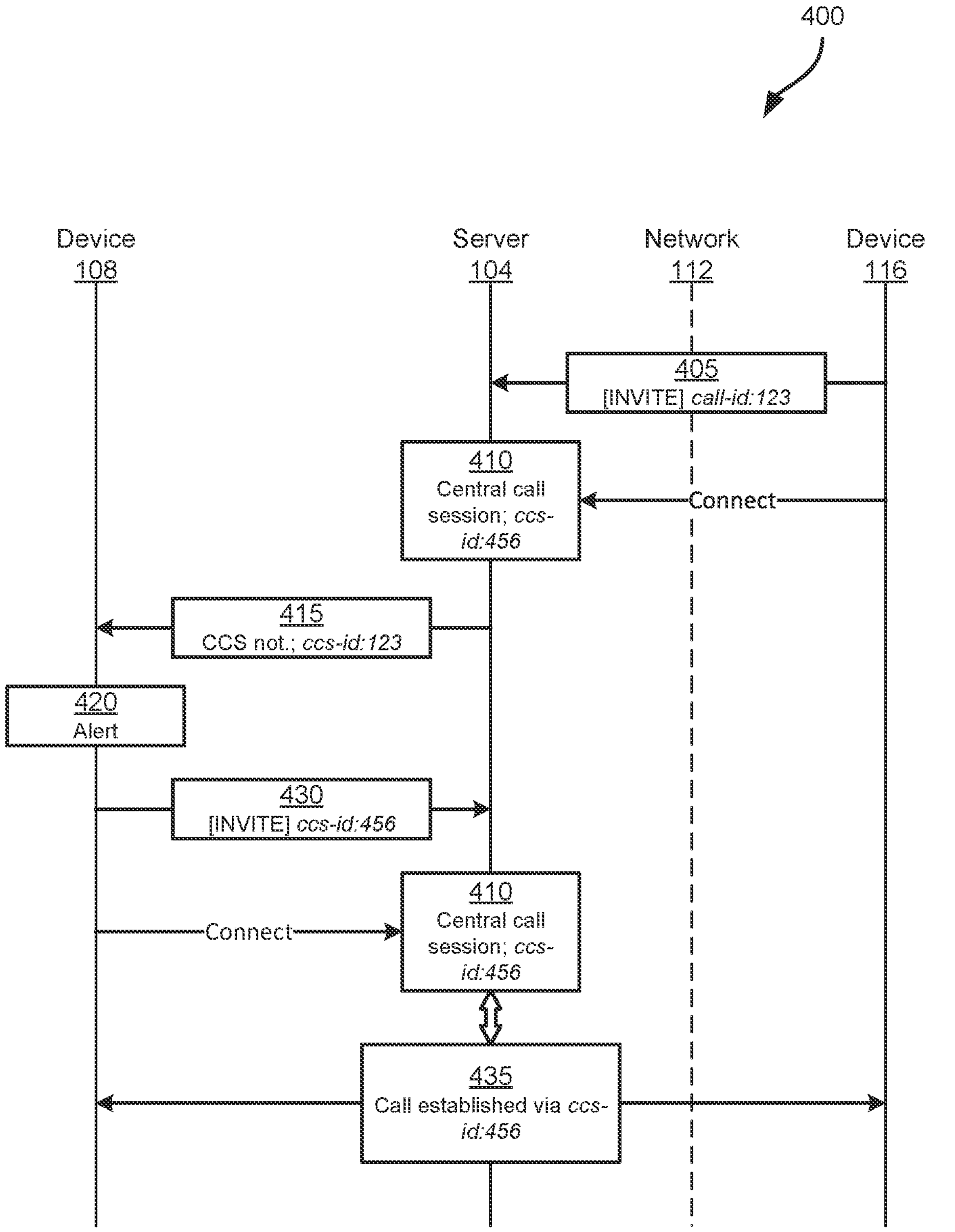
FIG. 4 depicts a schematic diagram of an example performance of establishing a call in the system of FIG. 1.

FIG. 4 depicts a schematic diagram of a call handling operation 400 in the system 100 for a successful connected call, in accordance with the present disclosure. The operation 400 will be described in conjunction with performance of the method 300, where reference numerals of the operation 400 correspond to blocks of the method 300. Further, the operation 400 will be described in context of SIP signaling. In other examples, other suitable methods and signaling protocols may be employed to achieve the call handling operation 400.

The operation 400 is initiated when the device 116 sends a call invitation 405, in the form of an [INVITE] message having a call identifier, in the present example, call-id:123. The call invitation 405 may further include source and target parameters (e.g., ‘to’ and ‘from’ fields) and the like (not shown).

The call invitation 405 may be received by the server 104 via the network 112 at block 305. The server 104 may then establish a central call session 410, having a central call session identifier, ccs-id:456. The server 104 may additionally connect the device 116 to the central call session 410 having identifier ccs-id:456.

The server 104 additionally sends a central call session notification (CCS not.) 415. The central call session notification 415 may be a push notification or similar by a third-party service. In particular, the central call session notification 415 includes the central call session identifier, ccs-id:456.

In response to the central call session notification, the device 108 generates an alert 420 (i.e., at block 320) to prompt a response to the server 104. The response may be a rejection (not shown) or an acceptance. In the case of an acceptance or affirmative response, the device 108 initiates a SIP [INVITE] request 430 (i.e., at block 330) to the server 104 indicating the central call session identifier, ccs-id:456.

In response to the SIP [INVITE] request 430, the server 104 connects the device 108 to the central call session 410 having central call session identifier ccs-id:456. Thus, the server 104 establishes the call 435 between the initiating device 116 and the target device 108 via the central call session 410 having central call session identifier ccs-id:456.

Calls established using call sessions hosted centrally at the server 104 may therefore be established more quickly and efficiently and more reliably, since there are fewer exchanges between the device 108 and the server 104, for example to perform a SIP [REGISTER] process prior to sending the SIP [INVITE] request.

Upon establishing the central call session, either endpoint device 108 or 116 may end the call, for example by indicating a hang-up action on the respective device. The hang-up action may send a SIP [BYE] message to the server 104 and the central call session 410, which may forward a SIP [BYE] message to the other endpoint device 108 or 116 to end the call 435.

Figure 5:
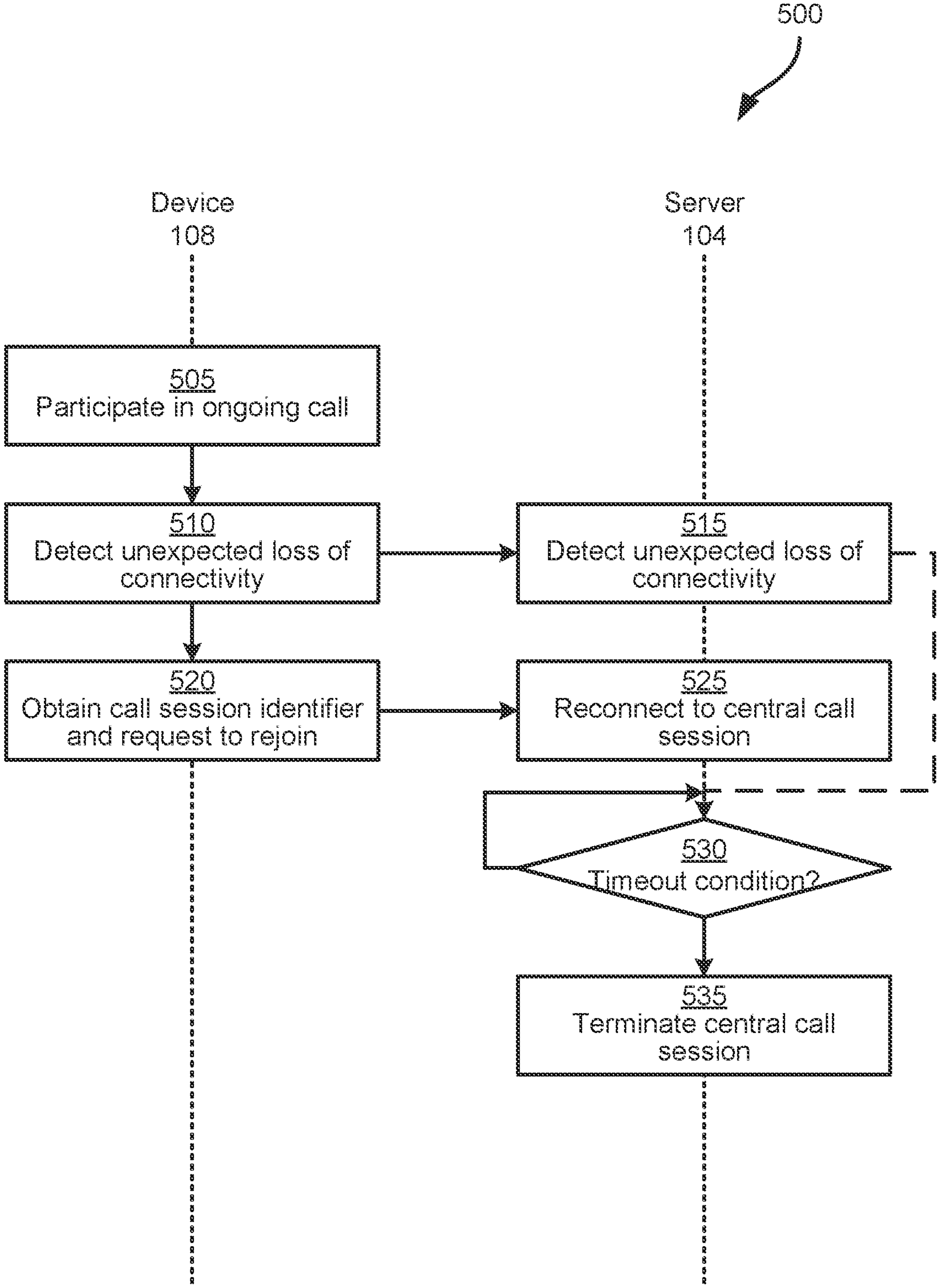
FIG. 5 depicts a flowchart of an example method of reconnecting to a call using central call sessions.

Further, since the device 108 initiates the SIP [INVITE] request, the subsequently established call (i.e., via the central call session) may be better protected against temporary network connectivity issues or the like. For example, referring to FIG. 5, an example method 500 of reconnecting to a central call session is depicted.

At block 505, the device 108 is in an ongoing call, via a central call session at the server 104, with the device 116. In some examples, the device 108 may be the target device as in the examples described above, while in other examples, the device 108 may be the initiating device of the ongoing call. That is, the method 500 may be applied by the server 104 and disconnecting device 108 irrespective of the origination of the ongoing call.

At block 510, the device 108 detects a loss of connectivity to the central call session. For example, the device 108 may be travelling through a region of poor network service, the device 108 may be experiencing difficulty or delays roaming from one access point to another, or similar. In particular, the loss of connectivity to the central call session may be an unexpected loss of connectivity, and not precipitated by an active termination by the device 108 or the device 116 (e.g., via the central call session).

Similarly, at block 515, the server 104 may detect the loss of connectivity of the device 108 from the central call session. The server 104 may provide an indication at the central call session that the device 108 has lost connectivity. In some examples, the server 104 may facilitate reconnection of the device 108 to the central call session, for example by issuing a further central call session notification to the device 108 to prompt the device 108 to rejoin the central call session.

At block 520, in response to detected unexpected loss of connectivity, the device 108 may obtain the central call session identifier and initiate a request to rejoin the central call session indicated by the central call session identifier. For example, the device 108 may obtain the central call session identifier from the application cache tracking pending and/or ongoing calls or from a further central call session notification re-issued by the server 104. The request to rejoin the central call session may be another SIP [INVITE] message or other standard invitation or call initiation according to other signaling protocols.

At block 525, in response to the request to rejoin the central call session issued at block 520, the server 104 may re-add or reconnect the device 108 to the central call session.

In some examples, if a request to rejoin the central call session is not received by the server 104, after detecting the unexpected loss of connectivity of the device 108 at block 515, the server 104 may proceed to block 530 to check for a timeout condition. For example, the timeout condition may include elapsing of a predefined timeout period (e.g., 10 seconds, 30 seconds, etc.) without receiving the request to rejoin the central call session. Further, the timeout condition may check the number of connected participants in the central call session. If the predefined timeout period has elapsed and there is one or fewer connected participants in the central call session, then the server 104 may determine that the timeout condition is met at block 530.

If the determination at block 530 is affirmative, that is, the timeout condition is met, then the server 104 may proceed to block 535 to terminate the central call session. In such examples, the server 104 may provide an indication of termination at the central call session to indicate that the device 108 has been disconnected.

If the determination at block 530 is negative, that is, the timeout condition is not met, then the server 104 may continue to wait for the request to rejoin the central call session at block 525 and/or return to block 530 to check for the timeout condition.

Thus, calls established via call sessions hosted centrally at the server 104 may facilitate reconnection of any of the endpoint devices a given call.

Figure 6:
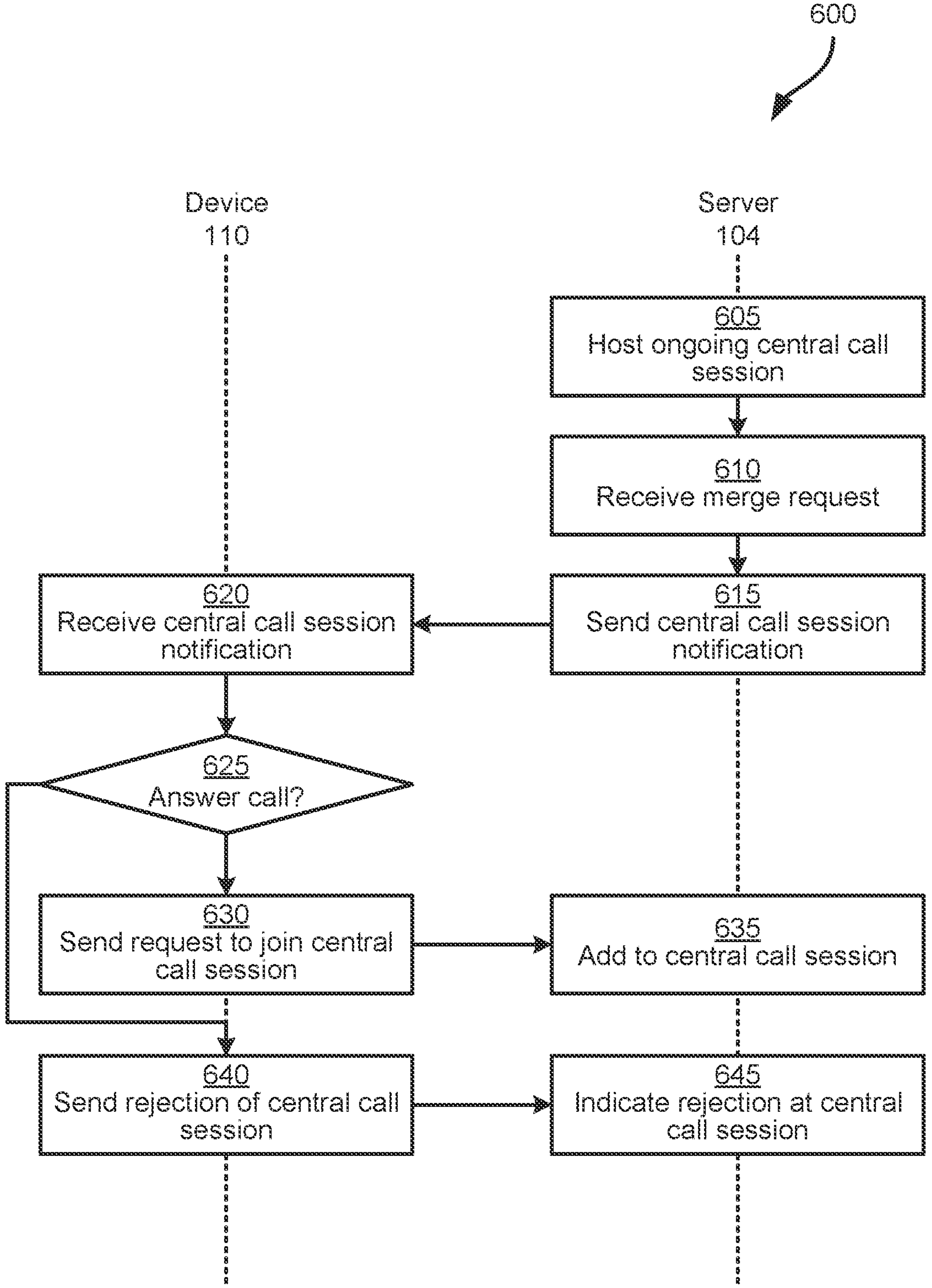
FIG. 6 depicts a flowchart of an example method of merging calls using central call sessions.

The call sessions hosted centrally at the server 104 may further facilitate other call functionality, such as call merging, to add another endpoint device as a participant to an ongoing call. For example, FIG. 6 depicts a flowchart of an example method 600 of merging a call.

At block 605, the server 104 is hosting an ongoing central call session, for example between the devices 108 and 116. In some examples, the device 108 may be the target device as in the examples described above, while in other examples, the device 108 may be the initiating device of the ongoing call. That is, the method 600 may be applied by the server 104 irrespective of the origination of the ongoing call.

At block 610, the server 104 receives a merge request from one of the participant devices of the ongoing central call session, that is, from one of the devices 108 and 116. The merge request may be similar to a call request and may specify a target account of the merge request. For example, the target may be identified by a target telephone number.

The server 104 may identify one or more devices associated with the target account. In the present example, the server 104 may identify the device 110 as being associated with the target account of the merge request.

At block 615, the server 104 sends a central call session notification to the target device identified at block 310, in the present example, the device 110. In particular, the central call session notification includes the call session identifier and may further include an indicator of the device 108, 116 from which the merge request was received. In some examples, the central call session notification may further include an indicator of the secondary participant(s), that is, the other of the devices 108, 116 acting as a participant in the ongoing call session.

The device 110 may receive and process the central call session notification at blocks 620 through 640 similarly as blocks 320 through 640 of the method 300. That is, at block 620, the device 110 receives the central call session notification and signals the central call session notification, for example via an alert, including auditory, mechanical, visual alerts, or the like. The alert may provide an indication of the device 108, 116 from which the merge request was received as the initiator of the call, and in some examples may further indicate that the incoming call includes multiple participants, including specific indicators of the secondary participant(s).

At block 625, the device 110 determines whether the call is accepted or rejected based on user input to the alert or expiry of a timeout of the alert.

If the determination at block 625 is affirmative, the device 110 proceeds to block 630 to send a response to the central call session notification to the server 104. In particular, the response may include a request to join the central call session, as identified by the central call session identifier, for example via a SIP [INVITE] message or other suitable signaling protocol invitation.

At block 635, the server 104 receives the request to join the central call session from the device 110 and in response, adds or connects the device 110 to the central call session identified in the request, effectively merging the call between the merge request initiating device and the device 110 with the call between the devices 108, 116.

If the determination at block 625 is negative, then the device 108 proceeds to block 640 to send a response to the central call session notification to the server 104. In particular, the response may include a rejection of the central call session notification.

At block 645, the server 104 receives the rejection of the central call session from the device 110. In response to the rejection, the server 104 may provide an indication of the rejection at the central call session to indicate that the merge request to the device 110 was rejected. Since the merge request is effectively to add a participant to the ongoing central call session, the server 104 may continue to maintain the central call session between the devices 108, 116. Further, since the server 104 may issue the central call session notification to the device 110 independently of the ongoing central call session, the central call session may be maintained while the merge request is being processed. This may improve user experience, since the ongoing central call session allows for continued communications, creating less confusion and fewer dropped calls.

As described herein, a telecommunications system establishes calls by adding the initiating device to a central call session and sending a prompt (i.e., a central call session notification) to the target device to prompt the target device to request to join the central call session. Accordingly, both endpoint devices of a call may treat the call as an outgoing call, rather than an incoming call, thereby simplifying the initial connection of the call, reconnections in the case of unexpected and/or temporary losses in connectivity, merging calls, and the like. Other applications and advantages of establishing calls using central call sessions will also be apparent to those of skill in the art.

The scope of the claims should not be limited by the embodiments set forth in the above examples but should be given the broadest interpretation consistent with the description as a whole.

The invention claimed is:

1. A method comprising:

receiving, from an initiating device, a call destined for a target account;

establishing, at a server, a central call session for the call and connecting the initiating device to the central call session;

sending a central call session notification to a target device associated with the target account, the central call session notification to prompt the target device to initiate a request to join the central call session;

receiving, from the target device, a response to the central call session notification; and when the response comprises the request to join the central call session, connecting the target device to the central call session to establish the call, wherein the request is processed at the target device as an outgoing call to the central call session.

2. The method of claim 1, further comprising: when the response comprises a rejection, terminating the central call session to end the call.

3. The method of claim 2, further comprising: providing an indication of the rejection to the initiating device via the central call session.

4. The method of claim 1, further comprising: prior to receiving the response, providing a pending indication to the initiating device via the central call session.

5. The method of claim 1, further comprising:

detecting an unexpected loss of connectivity of one of the initiating device and the target device; and in response to detecting the unexpected loss of connectivity, when a timeout condition is detected, terminating the central call session.

6. The method of claim 1, further comprising:

receiving a merge request for a further target account;

sending a further central call session notification to a further target device associated with the further target account, the further central call session notification to prompt the further target device to initiate a further request to join the central call session;

receiving, from the further target device, a further response to the further central call session notification; and when the further response comprises the further request to join the central call session, connecting the further target device to the central call session to merge further target device to the call.

7. A method comprising:

receiving, at a target device, a central call session notification from a server, the central call session notification indicating a call;

signaling the central call session notification to prompt a response to the central call session notification; and when the response comprises an acceptance of the call, sending a request to join a central call session identified in the central call session notification to the server to accept the call, wherein the request is processed at the target device as an outgoing call to the central call session.

8. The method of claim 7, further comprising: when the response comprises a rejection of the call, sending an indication of the rejection to the server to reject the call.

9. The method of claim 7, wherein the central call session notification indicates the call as an incoming call from an initiating device.

10. The method of claim 7, further comprising:

after joining the central call session, detecting an unexpected loss of connectivity to the central call session; and sending a further request to rejoin the central call session to the server to reconnect to the call.

11. A server comprising:

a memory and a communications interface;

a processor interconnected with the memory and the communications interface, the processor configured to:

receive, from an initiating device, a call destined for a target account;

establish a central call session for the call and connecting the initiating device to the central call session;

send a central call session notification to a target device associated with the target account, the central call session notification to prompt the target device to initiate a request to join the central call session;

receive, from the target device, a response to the central call session notification; and when the response comprises the outgoing call request to join the central call session, connect the target device to the central call session to establish the call, wherein the request is processed at the target device as an outgoing call to the central call session.

12. The server of claim 11, wherein the processor is further configured to: when the response comprises a rejection, terminate the central call session to end the call.

13. The server of claim 12, wherein the processor is further configured to: provide an indication of the rejection to the initiating device via the central call session.

14. The server of claim 11, wherein the processor is further configured to: prior to receiving the response, provide a pending indication to the initiating device via the central call session.

15. The server of claim 11, wherein the processor is further configured to:

detect an unexpected loss of connectivity of one of the initiating device and the target device; and in response to detecting the unexpected loss of connectivity, when a timeout condition is detected, terminate the central call session.

16. The server of claim 11, wherein the processor is further configured to:

receive a merge request for a further target account;

send a further central call session notification to a further target device associated with the further target account, the further central call session notification to prompt the further target device to initiate a further request to join the central call session;

receive, from the further target device, a further response to the further central call session notification; and when the further response comprises the further request to join the central call session, connect the further target device to the central call session to merge further target device to the call.

17. A computing device comprising:

a memory and a communications interface; and a processor interconnected with the memory and the communications interface, the processor configured to:

receive, at a target device, a central call session notification from a server, the central call session notification indicating a call;

signal the central call session notification to prompt a response to the central call session notification; and when the response comprises an acceptance of the call, send a request to join the central call session to the server to accept the call, wherein the request is processed at the target device as an outgoing call to the central call session.

18. The computing device of claim 17, wherein the processor is further configured to: when the response comprises a rejection of the call, send an indication of the rejection to the server to reject the call.

19. The computing device of claim 17, wherein the central call session notification indicates the call as an incoming call from an initiating device.

20. The computing device of claim 17, wherein the processor is further configured to:

after joining the central call session, detect an unexpected loss of connectivity to the central call session; and send a further request to rejoin the central call session to the server to reconnect to the call.

* * * * *